United States Patent
Benz et al.

(10) Patent No.: US 7,409,943 B2
(45) Date of Patent: Aug. 12, 2008

(54) ENGINE BRAKING METHOD FOR A SUPERCHARGED INTERNAL COMBUSTION ENGINE

(75) Inventors: Michael Benz, Ostfildern (DE); Stephan Krätschmer, Schwäbisch Gmünd (DE); Erwin Schmidt, Baltmannsweiler (DE); Alexander Stadelmaier, Schwäbisch Gmünd (DE); Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 26 days.

(21) Appl. No.: 11/705,335

(22) Filed: Feb. 12, 2007

(65) Prior Publication Data
US 2007/0137615 A1    Jun. 21, 2007

Related U.S. Application Data

(63) Continuation-in-part of application No. PCT/EP05/05227, filed on May 13, 2005.

(51) Int. Cl.
*F02D 13/04* (2006.01)
*F02B 33/00* (2006.01)
(52) U.S. Cl. .............. 123/321; 123/65 BA; 123/65 VD
(58) Field of Classification Search ......... 123/321, 123/322, 323, 65 BA, 65 VD
See application file for complete search history.

(56) References Cited

U.S. PATENT DOCUMENTS

| 4,981,119 A | 1/1991 | Neitz et al. ............. 123/321 |
| 5,117,790 A | 6/1992 | Clarke et al. ............ 123/321 |
| 5,121,723 A * | 6/1992 | Stepper et al. ........... 123/322 |
| 5,537,976 A | 7/1996 | Hu ..................... 123/322 |
| 5,680,841 A | 10/1997 | Hu ..................... 123/322 |
| 5,724,939 A * | 3/1998 | Faletti et al. ........... 123/322 |
| 5,730,102 A * | 3/1998 | Arnold et al. ........... 123/322 |
| 5,758,620 A * | 6/1998 | Warner ................. 123/321 |
| 6,000,374 A * | 12/1999 | Cosma et al. ........... 123/321 |
| 6,256,991 B1 | 7/2001 | Schmidt et al. .......... 60/602 |
| 6,293,248 B1 | 9/2001 | Zsoldos et al. .......... 123/321 |
| 6,301,541 B1 * | 10/2001 | Hosomi et al. ........... 701/89 |
| 6,609,495 B1 * | 8/2003 | Cornell et al. .......... 123/321 |
| 6,866,017 B2 * | 3/2005 | Ruggiero et al. ......... 123/321 |
| 7,162,996 B2 * | 1/2007 | Yang ................... 123/321 |
| 7,222,614 B2 * | 5/2007 | Bryant ................. 123/559.1 |
| 2002/0162530 A1 | 11/2002 | Seitz et al. ............. 123/321 |

FOREIGN PATENT DOCUMENTS

| AT | 408 129 | 9/1997 |
| DE | 196 37 999 | 3/1998 |
| DE | 197 27 140 | 12/1998 |
| DE | 198 53 360 | 5/2000 |
| DE | 103 17 515 | 11/2004 |
| WO | WO 2004/059131 | 7/2004 |

* cited by examiner

Primary Examiner—Willis R. Wolfe, Jr.
Assistant Examiner—Johnny H. Hoang
(74) Attorney, Agent, or Firm—Klaus J. Bach

(57) ABSTRACT

In an engine braking method for a supercharged internal combustion engine, wherein combustion air, which is under boost pressure and is supplied to the cylinders under the control of engine inlet and outlet valves, is compressed in the cylinders and is subsequently discharged into the exhaust tract, engine braking takes place in a two-stroke operating mode.

11 Claims, 6 Drawing Sheets

ENGINE BRAKING METHOD FOR A SUPERCHARGED INTERNAL COMBUSTION ENGINE

This is a Continuation-In-Part Application of International application PCT/EP2005/05227 filed May 13, 2005.

BACKGROUND OF THE INVENTION

The invention relates to an engine braking method for a supercharged internal combustion engine.

An engine braking method is known from DE 196 37 999 A1. The internal combustion engine is equipped with an exhaust gas turbocharger, the exhaust gas turbine of which is provided with a variable turbine geometry for variably setting the effective turbine inlet flow cross section. To achieve high engine braking power, the variable turbine geometry is adjusted into a blocking position reducing the cross section, with the result that the exhaust back pressure between the cylinder outlets and the exhaust gas turbine rises. The engine braking power is regulated via a controller in the internal combustion engine as a function of current engine and operating variables and also of the driver's instruction by a variation in the opening curve of a throttle valve on the cylinders. This throttle valve opens toward the end of the compression stroke and maintains its opening position until the end of the expansion stroke, whereas, during the inlet stroke, the throttle valve remains closed. The engine braking method is in the form of a four-stroke method in which the pistons in the cylinders have to perform expulsion work counter to the exhaust gas backpressure.

U.S. Pat. No. 6,293,248 B1 discloses a two-stroke engine braking method for a supercharged internal combustion engine. In this braking method, combustion air which is under boost pressure is supplied to the cylinders by the control of charge exchange valves, that is to say of inlet and outlet valves, is compressed there and is subsequently discharged into the exhaust tract. This takes place in that, shortly before top dead center is reached, the outlet valve is opened and, after top dead center is overshot, is closed again. Before the outlet valve is closed, in the expansion stroke, the inlet valve is opened, so that, during an overlap phase, both the inlet valve and the outlet valve are open. The inlet valve remains open over a relatively long crank angle range, specifically over and beyond bottom dead center into a middle piston lift range of the compression stroke. Only approximately in the middle between bottom and top dead center is the inlet valve closed during the compression stroke, so that, also only thereafter, all the valves are closed and the maximum pressure build-up can be achieved in the cylinder. However, because of the late inlet closing time point and the already shortly following outlet opening time, the angular range in which all the valves are closed during the compression stroke is restricted to a relatively small crank angle range. Correspondingly, only a low maximum pressure built up can be achieved.

It is the object of the present invention to provide an engine braking method for a supercharged internal combustion engine, by means of which a high braking powers, along with a relatively low mechanical and thermal loads, can be implemented.

SUMMARY OF THE INVENTION

In an engine braking method for a supercharged internal combustion engine, wherein combustion air, which is under boost pressure and is supplied to the cylinders under the control of engine inlet and outlet valves, is compressed in the cylinders and is subsequently discharged into the exhaust tract, engine braking takes place in a two-stroke operating mode.

In a two-stroke engine braking operating mode, in the expansion stroke of the cylinders, the inlet valve is opened before the piston reaches its bottom dead center position and is closed again after bottom dead center is overshot. In the immediately following compression stroke, the outlet valve is opened before the top dead center is reached and is closed again after top dead center is overshot.

As compared with the four-stroke method, the two-stroke method leads, during engine braking, to markedly lower loads on the components of the internal combustion engine, since, in the two-stroke method, the internal combustion engine has a higher mass flow throughput during engine braking, this being accompanied, at comparable engine braking powers, by lower turbine inlet pressures and turbine inlet temperatures in the exhaust tract. On account of the reduced load, higher engine braking power than during four-stroke engine braking are possible. By means of the proposed engine braking method by two-stroke operation, not only are the internal combustion engine components, which are in contact with the throughput gases subjected to lower stresses, but the wear of the wheel brakes is also reduced, since a higher braking power load can be assumed by the engine brake so that the wheel brakes are relieved.

The increased air quantity which can pass through the internal combustion engine during two-stroke braking operation also leads to neutralizing the problem of compressor surge at high specific braking powers. With comparable engine braking powers, in the compressor characteristic map the engine braking line of two-stroke braking is at a greater distance from the surge limit than the engine braking line of four-stroke braking. A further reduction in the risk of engine pumping can be achieved, despite a higher engine braking power, by closing the outlet valve before the inlet valve is opened.

In the two-stroke engine braking phase, for sucking the normally highly compressed combustion air provided by the supercharging assembly, the cylinder inlet valve is opened as soon as the piston enters the region of bottom dead center. After the bottom dead center position is passed, the inlet valve is closed again, the corresponding cylinder then being in the compression phase in which all the valves are normally closed. When the top dead center position is approached, the outlet valve is opened with the result that the compressed air is discharged into the exhaust tract in a very short time because of the high cylinder internal pressure. After the top dead center position has been overshot, that is to say during the expansion stroke, the outlet valve is closed again. A complete work cycle is thereby concluded.

Expediently, the opening time point and the closing point of time of the inlet valve lie in a crank angle range of 30° before and after the bottom dead center position, although, of course, even lower angle values may be considered, with the result that the opening or closing time point of the inlet valve is brought nearer to bottom dead center. In this phase, the lowest cylinder internal pressure prevails, this being conducive to an inflow of compressed combustion air from the intake tract.

In an alternative version, however, it may also be expedient to provide the inlet opening time point at a greater angular distance from bottom dead center and, particularly during continuous operation of the engine braking method, to set it variably as a function of engine state and operating variables and also as a function of the driver's instruction.

The opening time point of the outlet valve expediently lies within a 30° crank angle range before top dead center. At top dead center, the cylinder internal pressure is highest, an opening of the outlet valve shortly before top dead center is reached linking the high cylinder internal pressure favorable for discharge to the expulsion movement of the piston. Where the outlet valve is concerned, too, lower angular distances from top dead center may be considered, such as, for example, an angular distance of 5° or 10° before top dead center is reached.

According to a first advantageous version, the outlet closing time point of the outlet valve lies even before the inlet opening time point of the inlet valve, so that, for a short time span before the opening of the inlet valve, all the charge exchange valves are closed, and an overflow of gas, in particular out of the exhaust tract via the cylinder inner space back into the intake tract is prevented.

According to a further advantageous version, a recirculation of the gas out of the exhaust tract back into the intake tract via what is known as internal recirculation following the path via the cylinder is selected, in order, for example, in this way to influence the engine braking power or else to break down the exhaust back pressure.

The outlet valve which is opened and closed in the two-stroke engine braking method is advantageously the regular outlet charge exchange valve which is also used in the fueled driving operating mode of the internal combustion engine. In an alternative version, however, the outlet valve may also be a separate brake valve which is additionally provided, in which case an additional brake valve of this type may be designed with a small build and having a correspondingly low mass.

The invention will become more readily apparent from the following description of a preferred embodiment thereof on the basis of the accompanying drawings:

DESCRIPTION OF A PARTICULAR EMBODIMENT

Figure 1:
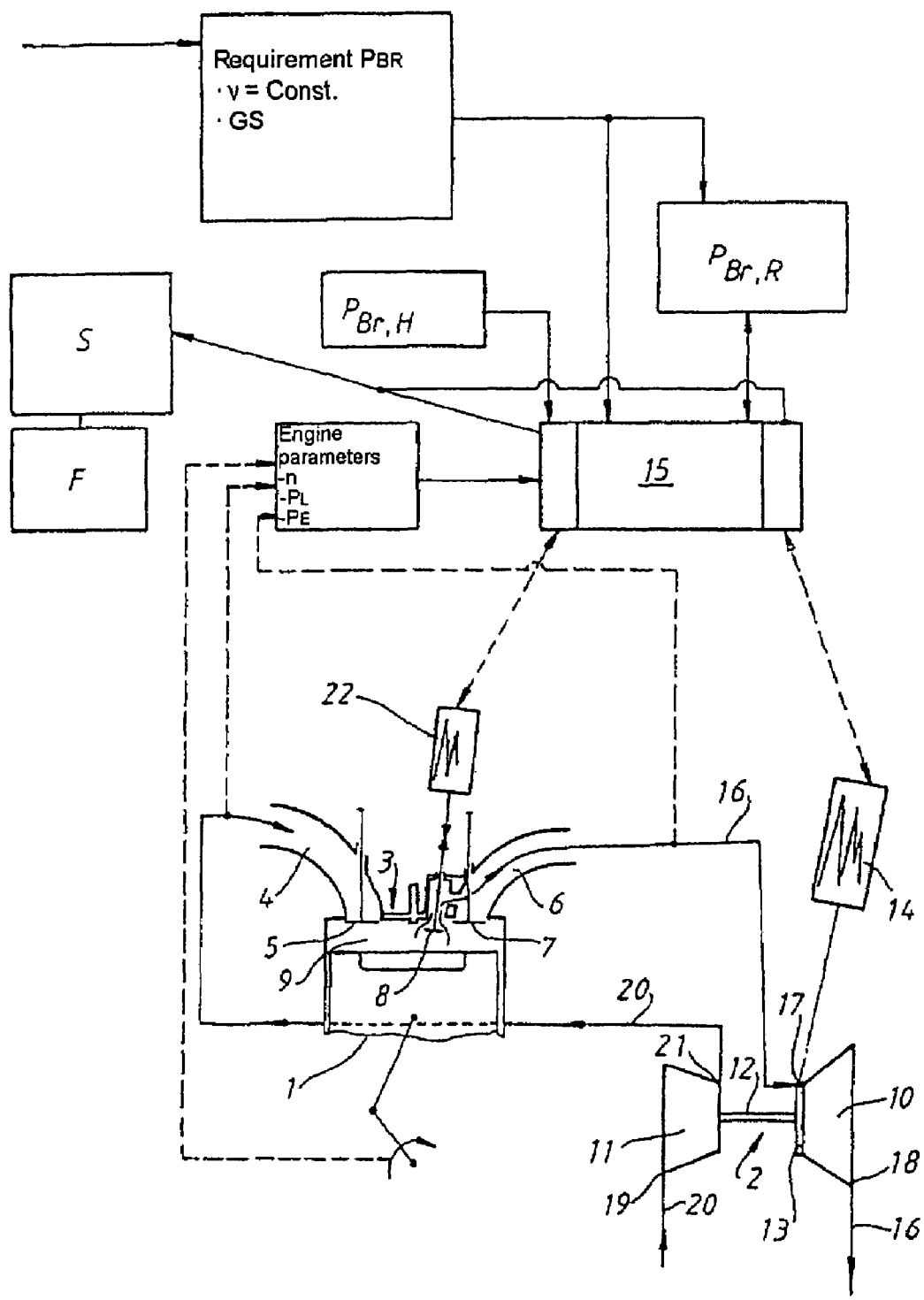
FIG. 1 shows diagrammatically an internal combustion engine with an exhaust gas turbocharger, with a cylinder of an internal combustion engine in an enlarged view, including the charge exchange valves and brake valves on this cylinder.

In the internal combustion engine shown in a diagrammatic illustration in FIG. 1, a cylinder 1 with charge exchange valves 5, 7 in the cylinder head 3 is illustrated. The internal combustion engine includes an exhaust gas turbocharger 2 which comprises an exhaust gas turbine 10 in the exhaust line 16 of the internal combustion engine and a compressor 11 in the intake tract 20, the turbine wheel being rotationally coupled to the compressor wheel via a shaft 12. The exhaust gas turbine 10 is equipped with a variable turbine geometry 13 for variably setting the effective turbine inlet cross section, the variable turbine geometry being adjustable via an actuator 14.

The combustion air is first supplied, in the intake tract 20, via the compressor inlet 19 to the compressor wheel in the compressor 11, is compressed there and enters the cylinder inlet via the compressor outlet 21. With the inlet valve 5 open, the compressed combustion air is supplied via an inlet duct 4 of the internal combustion engine to the combustion chamber 9 in the cylinder 1. After combustion has taken place, the gases in the combustion space 9 are discharged via the open outlet valve 7 into an exhaust manifold 6 and from there further on into the exhaust line 16. The exhaust gases are discharged via the turbine inlet 17 into the exhaust gas turbine 10 and there drive the turbine wheel. The expanded exhaust gases leave the exhaust gas turbine via the turbine outlet 18.

The cylinder 1 is provided, in addition to the charge exchange valves, with a brake valve 8 which in the opening position, like the outlet valve 7, connects the combustion space 9 to the exhaust manifold 6. The stroke curve of the brake valve 8 can be set freely via an actuator 22. The other charge exchange valves 5 and 7 can also be set freely via corresponding actuators. Setting takes place via actuating signals from a regulating and control unit 15, in which all the engine state and operating variables and also the driver's requirements are processed and all the devices are adjusted, inter alia also the actuator 14 for the variable turbine geometry 13.

Adjustments via the control unit 15 occur particularly as a function of the rotational speed n of the internal combustion engine, the boost pressure $p_L$ in the inlet duct 4 and the turbine inlet pressure $p_E$ at the turbine inlet 17. Further influencing variables are the braking power requirements $P_{BR}$ Of the mechanical wheel brake $P_{BR,R}$ and of the handbrake $P_{BR,A}$ and, as input signals, the driving speed v and, if appropriate, a hazard signal GS characterizing a hazardous situation. Furthermore, as illustrated in block S, a safety check of the functioning of the brake valve 8 can be carried out, and, if a malfunction is detected, a fault signal F is generated which is indicated to the driver.

During engine braking, the desired braking power is generated, as far as possible, via the engine brake. If the braking power requirement which is demanded by the driver and/or in an automated manner via the regulating and control unit overshoots the instantaneously generable maximum engine braking power, then the wheel brake is activated automatically. The apportionment of the braking power between the engine brake and wheel brake normally takes place solely via the regulating and control unit 15 without the driver's influence.

The engine braking power may be generated by four-stoke braking or two-stroke braking. In four-stroke braking mode, the inlet valve 5 is opened during the inlet stroke in the vicinity of top dead center, with the result that compressed combustion air can flow into the combustion space 9 via the inlet duct 4. Subsequently, the compression and expansion strokes take place, and thereafter the outlet stoke, in which the outlet valve 7 or the brake valve 8, or if appropriate both valves, are opened, so that the combustion space content can be discharged into the exhaust line 16 via the exhaust manifold 6. At the same time, expediently, the variable turbine geometry 13 is in a build-up position minimizing the effective turbine inlet cross section, this being conducive to the build-up of an increased exhaust back pressure counter to which expulsion work has to be performed. The gas which is under high pressure flows via the remaining free flow cross sections of the variable turbine geometry 13 onto the turbine wheel and drives the latter, whereupon compression work is performed in the compressor and sucked-in combustion air is compressed to an increased boost pressure at which the combustion air is supplied to the cylinder.

By contrast, in two-stroke braking, the inlet valve 5 is opened in the expansion stroke of the cylinders and, in the immediately following compression stroke, one of the outlet valves 7, 8 is opened for the discharge of the compressed gas into the exhaust line. In two-stroke braking too, the variable turbine geometry in the exhaust turbine 10 is in the build-up position.

Figure 2:
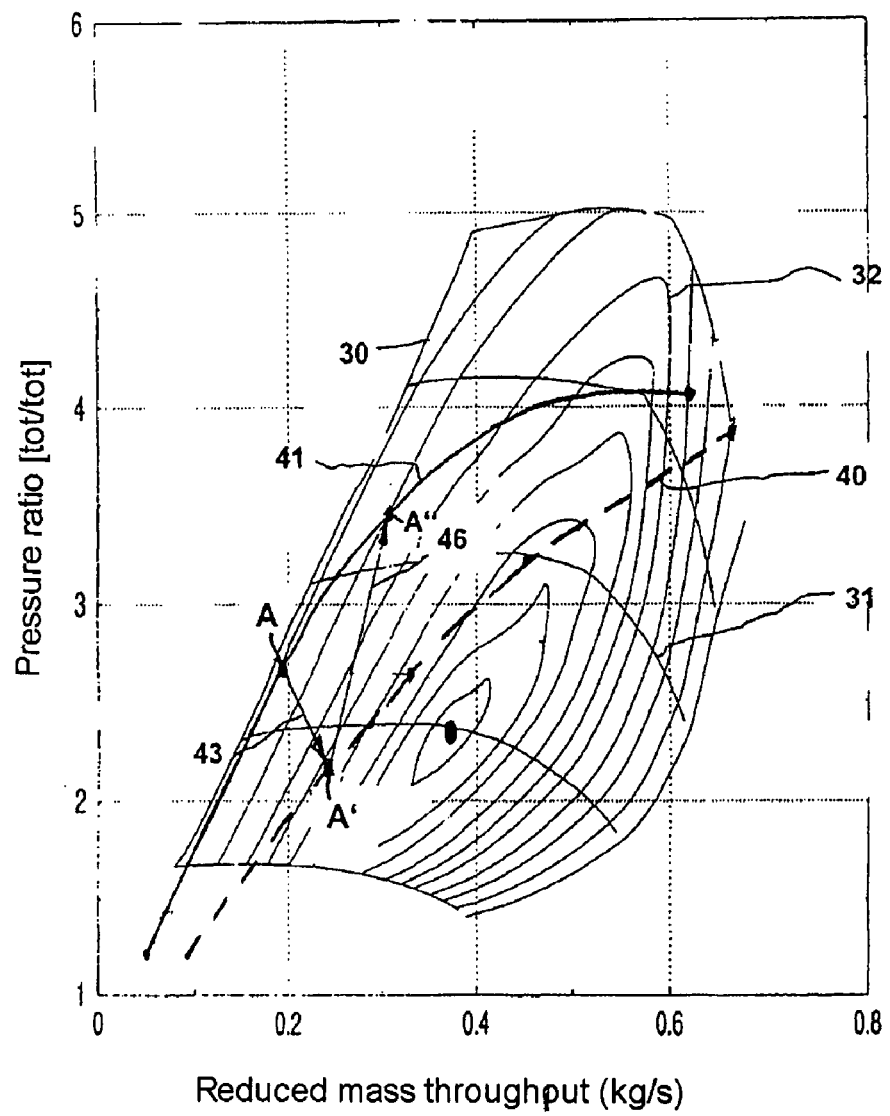
FIG. 2 shows a compressor performance graph for the compressor of the exhaust gas turbocharger, with depicted engine braking power lines for four-stroke braking and two-stroke braking.

FIG. 2 illustrates the compressor performance graph for the compressor of the exhaust turbocharger. The reduced mass throughput through the compressor is entered on the abscissa of the characteristic map, and the ordinate shows the total pressure ratio of the compressor. The compressor characteristic map is limited laterally by a surge limit 30 in the direction of low mass throughputs. Furthermore, rotational speed lines and efficiency lines 32 are provided, which in each case illustrate isolines of identical values.

The characteristic line 40 for two-stroke braking and the characteristic line 41 for four-stroke braking illustrate comparable engine braking power curves. As may be gathered from FIG. 2, however, the characteristic line 40 for two-stroke braking is displaced in favor of increased mass throughputs, at the same time with a lower total pressure ratio, as compared with the characteristic line 41 for four-stroke braking. This means that, in two-stroke braking, with the engine braking power being the same, lower pressure and temperatures arise than in four-stroke braking, with the result that component load is reduced. As compared with the characteristic line 41, the characteristic line 40 for two-stroke braking is at a markedly greater distance from the surge limit 30, so that, in two-stroke braking, the risk of compressor surge is considerably reduced.

The lower pressures and temperatures in two-stroke braking also have an advantageous effect on the exhaust gas turbine, since lower inlet pressures and inlet temperatures prevail at the exhaust gas turbine.

In FIG. 2, as an example of identical braking powers, the points A for four-stroke braking and A' for two-stroke braking are entered. As can be seen, the transition from A to A' according to the arrow 43, that is to say the transition from four-stroke braking to two-stroke braking, is accompanied by a considerable lowering of the pressure ratio, at the same time with a slight rise in the mass throughput through the compressor. The arrow 46 illustrates the transition from the braking power point A' of two-stroke braking to a braking power point A'' which, with the engine rotational speed remaining the same, characterizes a considerably higher braking power in the two-stroke braking method. The potential for an increase in the specific engine braking power during two-stroke braking is of an order of more than 50% in comparison with four-stroke braking. The increase from A' to A'' in two-stroke engine braking is achieved by a rise in the boost pressure.

As a design rule for dimensioning the exhaust gas turbocharger used, a turbo braking factor TBF may be defined, which is determined according to the relation $$TBF = A_T * D_T / V_H$$

from the parameters $A_T$ (free flow cross section in the exhaust gas path to the turbine at maximum braking power), $D_T$ (inlet diameter of the turbine wheel) and $V_H$ (piston-swept volume of the internal combustion engine). The turbo braking factor links size ratios in the exhaust gas turbine to the piston-displacement volume VH of the internal combustion engine. This turbine braking factor TBF is at a value of less than 0.0075 (7.5‰), in the case of exhaust gas turbochargers operated solely by the two-stroke engine braking method, whereas exhaust gas turbochargers operated by the four-stroke braking method have a turbo braking factor TBF of lower than 0.005 (5‰). Turbo braking factors of this order represent in each case optimum coordination between the internal combustion engine and exhaust gas turbine.

The 50% higher value of the turbo braking factor TBF for the two-stroke braking method, as compared with the four-stroke braking method, means that exhaust gas turbines with larger flow cross sections and larger inlet diameters of the turbine wheel can be used, which can have a higher throughput of engine air. This leads to neutralizing the problem of compressor surge at high specific braking powers.

Figure 3:
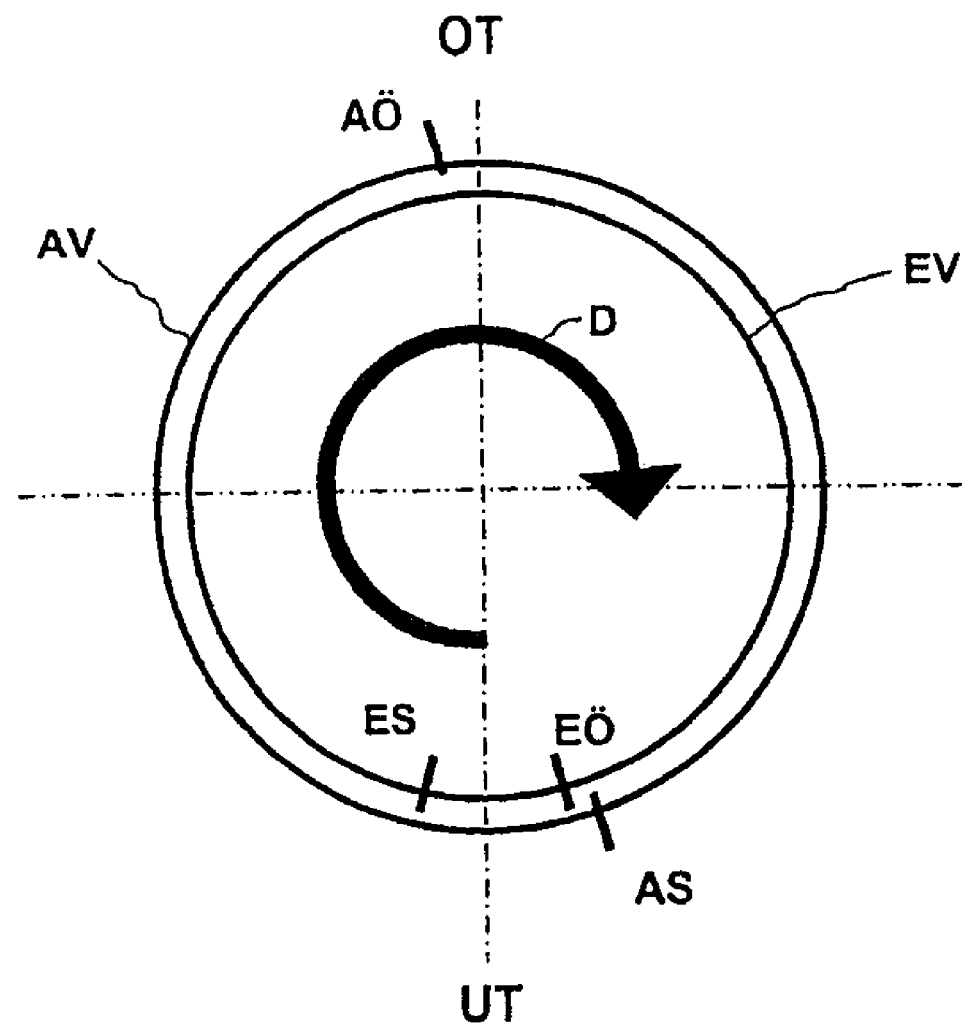
FIG. 3 shows a phase diagram with the opening and closing time points of the charge exchange valves, illustrated for two-stroke braking.

FIG. 3 shows the phase diagram for the opening and closing time points of the inlet and outlet valves of the cylinder during two-stroke engine braking. The inlet valve phase EV for the crank angle range of 360° and the outlet valve phase AV likewise for the crank angle range above 360° are illustrated. The time sequence of the opening and closing time points is identified by the direction of the arrow D.

In the expansion stroke of the cylinder, the inlet valve is opened at the inlet opening time point EÖ shortly before bottom dead center UT is reached, since, in this phase, the cylinder internal pressure is relatively low, this being conducive to the supply of combustion air which is under increased boost pressure. The inlet opening time point EÖ is about 15° before bottom dead center UT.

About 10° to 15° after bottom dead center UT is overshot, the inlet valve is closed again at the time point ES, and, with the valves closed, the piston executes the compression stroke in the cylinder. Shortly before top dead center OT is reached, the outlet valve is opened, still during the compression stroke, at the outlet opening time point AÖ, the time point AÖ being less than 10° before top dead center OT. The outlet valve remains open for a period of time of approximately 180° in the following expansion stroke and closes at the time point AS only immediately before the inlet opening time point EÖ. The outlet closing time point AS is only a few degrees of crank angle before the inlet opening time point EÖ. In this version of the engine braking method in two-stroke braking, no overlap of opened inlet valves and outlet valves takes place. This prevents a recirculation of the air from the engine outlet tract into the engine intake tract.

The opening of the outlet valve at the time point AÖ shortly before top dead center is reached by the piston results, because of the high cylinder internal pressure prevailing at this time point, in an abrupt discharge of the air compressed in the combustion space.

Figure 4:
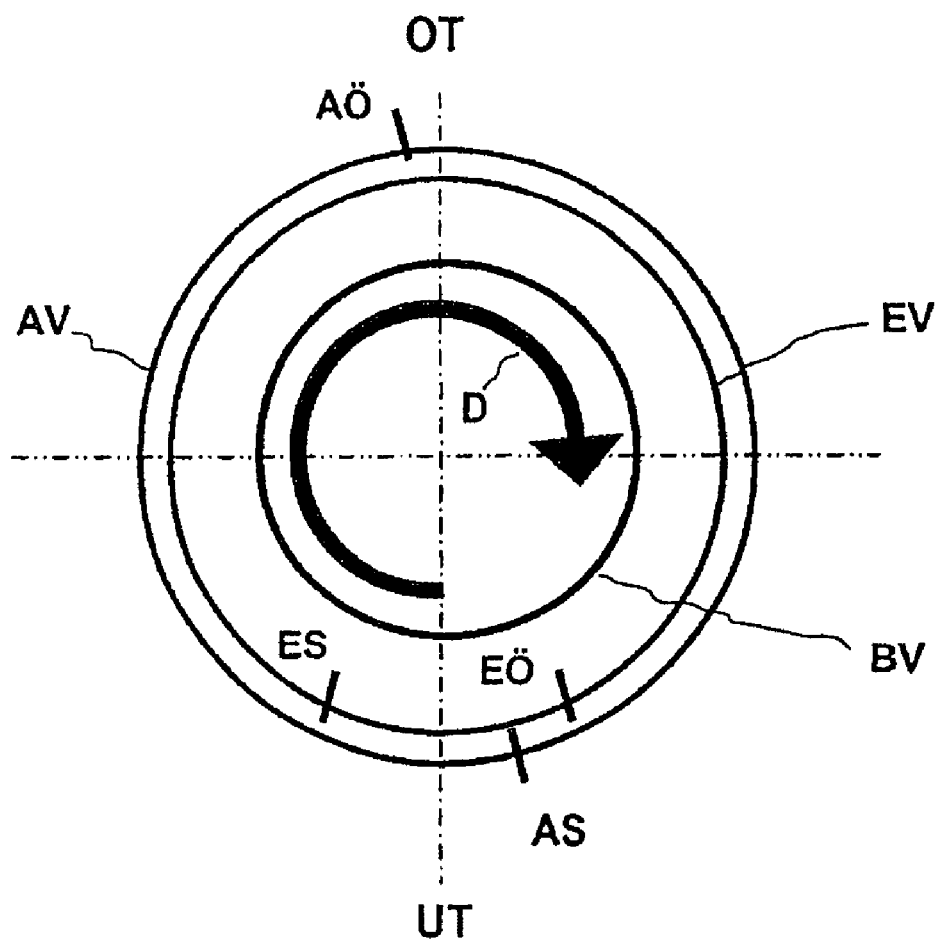
FIG. 4 shows an illustration corresponding to FIG. 3, but with an additional entry for a brake valve.

A variant of the method of FIG. 3 is illustrated in FIG. 4. The outlet closing time point AS is after the inlet opening time point EÖ in time, so that, in the intermediate angular range, the inlet valve and the outlet valve are simultaneously in the opening position, with the result that a recirculation of the air of the outlet tract into the inlet tract is brought about. The recirculation quantity can be influenced via the overlap of the angular range between inlet opening EÖ and outlet closing AS.

As a further possibility for recirculating the air of the outlet tract into the inlet tract, the brake valve phase BV is illustrated, which characterizes the constantly open position of the brake valve provided in addition to the outlet valve. This brake valve remains permanently open in the version according to FIG. 4.

Figure 5:
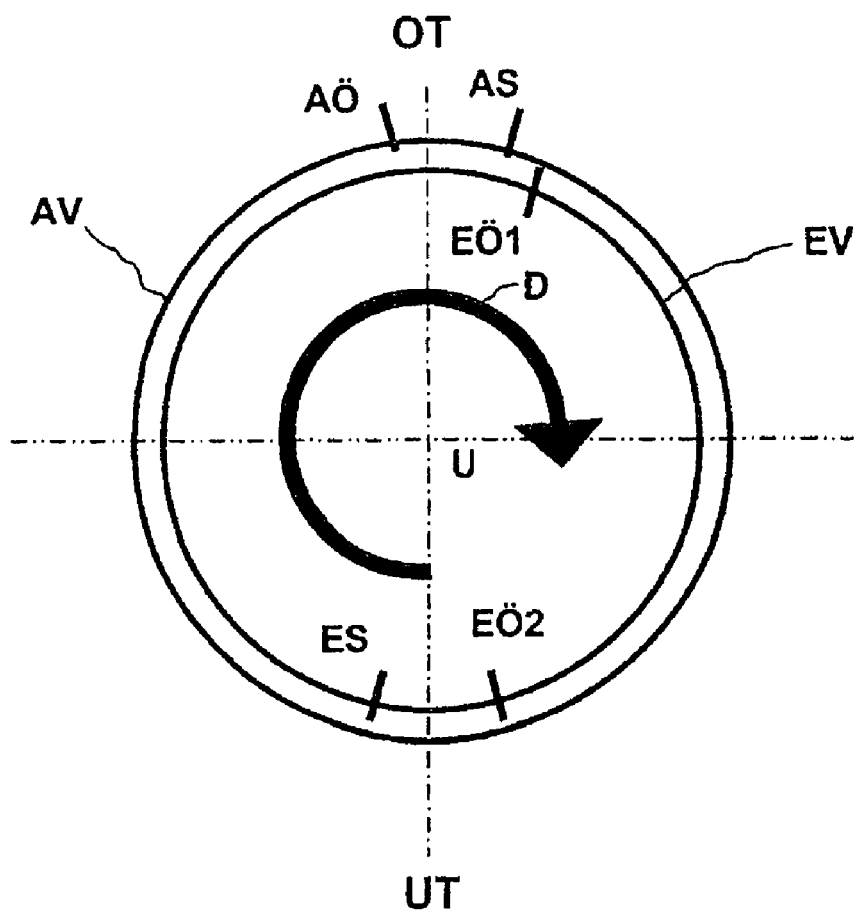
FIG. 5 shows a phase diagram for two-stroke braking in a variant according to which the inlet opening time points can be set variably.
Figure 6:
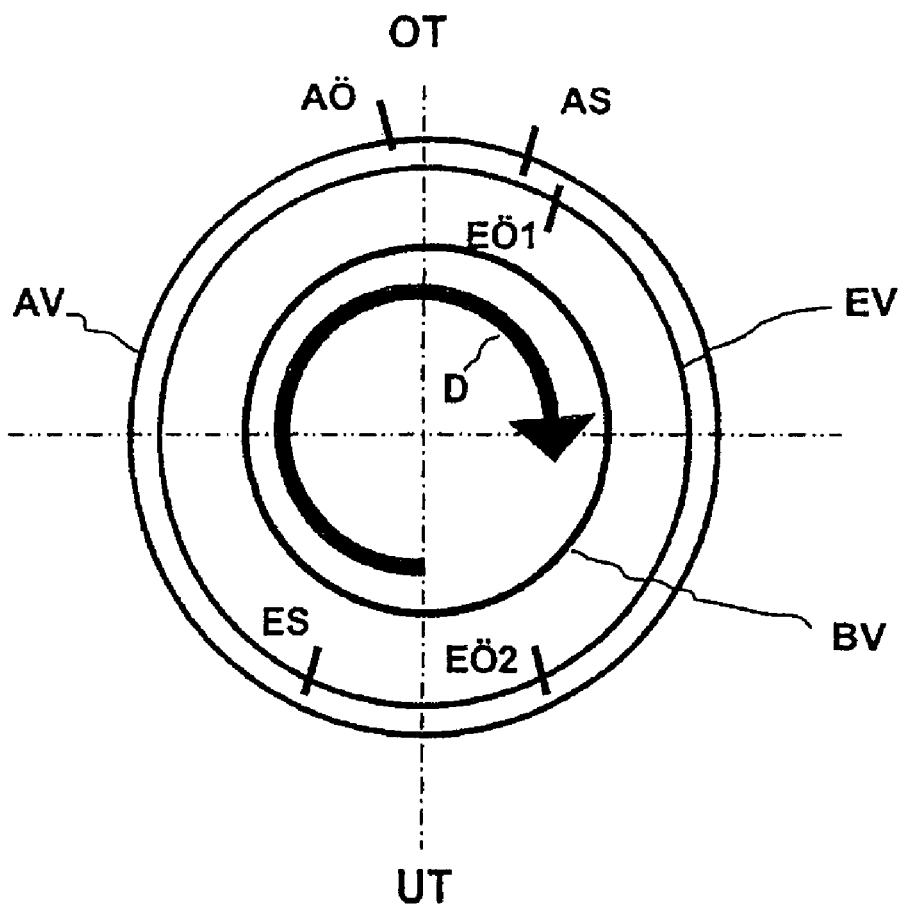
FIG. 6 shows an illustration corresponding to FIG. 5, but with an additional entry for a brake valve.

FIGS. 5 and 6 show exemplary embodiments through which, in two-stroke braking, the inlet opening time point of the inlet valve can be varied during the downward stroke of the piston (expansion stroke) in a relatively large angular range which is marked by the limit values EÖ1 and EÖ2. The closing time point AS of the outlet valve can also be set variably. The outlet closing time point AS and the inlet opening time point EÖ between EÖ1 and EÖ2 are designed for achieving maximum braking power.

In the exemplary embodiments according to FIGS. 5 and 6, the outlet closing time point AS is immediately before the inlet opening time point EÖ1. In principle, as also illustrated in FIG. 4, the outlet closing time point AS may occur after the inlet opening time point, in order to allow recirculation of the air out of the exhaust tract in the intake tract.

The valve control times, illustrated in FIG. 5, for the inlet valve and the outlet valve are distributed virtually symmetrically with respect to bottom dead center UT and top dead center OT. The opening time point and the closing time point, in the case of the inlet valve the latest possible inlet opening time point EÖ2, are within an angular range of no more than about 20° before and after top and bottom dead center OT and UT respectively.

FIG. 6 differs from the exemplary embodiment according to FIG. 5 in that an additional brake valve is illustrated, the phase of which is characterized by BV. This brake valve is open permanently in a similar way to the exemplary embodiment according to FIG. 4.

What is claimed is:

1. An engine braking method, to be carried out in a two-stroke mode, for a supercharged internal combustion engine, in which combustion air, which is supplied to cylinders (1) under boost pressure, is compressed in the cylinders (1) by controlling of charge exchange valves (5, 7),) and is subsequently discharged into the exhaust tract (16), said method comprising the steps of:
    opening during an expansion stroke of a piston in the cylinder (1), an inlet valve (5) before the piston reaches a bottom dead center position (UT) and closing it again after the bottom dead center (UT) is overshot, a closing time point (ES) of the inlet valve (5) lying within a 30° crank angle range after bottom dead center (UT), and,
    in a subsequent compression stroke, opening an outlet valve (7) before the piston reaches its top dead center position (OT) and closing the outlet valve again after the top dead center position (OT) is overshot.

2. The engine braking method as claimed in claim 1, wherein the opening time point (AÖ) of the outlet valve (7) lies within a 30° crank angle range before the top dead center (OT).

3. The engine braking method as claimed in claim 1, wherein the opening time point (EÖ) of the inlet valve (5) lies within a 30° crank angle range before bottom dead center (UT).

4. The engine braking method as claimed in claim 1, wherein the inlet valve is opened between 30° after the top dead center (OT) and before the bottom dead center (UT) is reached as a function of the current braking power requirement.

5. The engine braking method as claimed in claim 1, wherein the closing time point (AS) of the outlet valve (7) lies within a 20° crank angle range before or after the opening time point (EÖ) of the inlet valve (5).

6. The engine braking method as claimed in claim 1, wherein a brake valve (8) opening into the exhaust tract (16) of the internal combustion engine is provided in addition to the outlet valves (7) to be actuated during fueled drive.

7. The engine braking method as claimed in claim 6, wherein, for carrying out the engine braking method, the outlet valves (7) are opened and closed, and, during engine braking, the brake valve (8) remains permanently open.

8. The engine braking method as claimed in claim 1, wherein, to increase the exhaust back pressure, a variable turbine geometry (13) in the exhaust gas turbine (10) for variably setting the effective turbine inlet cross section is moved into a blocking position.

9. The engine braking method as claimed in claim 1, wherein, in the two-stroke engine braking method, a turbo braking factor (TBF) of the exhaust gas turbocharger, which is related to engine braking at maximum braking power and which is determined according to the relation $$TBF = A_T * D_T / V_H$$

from the parameters
    $A_T$ free flow cross section in the exhaust gas path to the turbine at maximum braking power
    $D_T$ inlet diameter of the turbine wheel
    $V_H$ piston-swept volume of the internal combustion engine,
has a value lower than 0.0075 (7.5‰):

$$TBF < 0.0075.$$

10. The engine braking method as claimed in claim 1, wherein a changeover is made between the two-stroke engine braking method and a four-stroke engine braking method as a function of engine state and operating variables.

11. The engine braking method as claimed in claim 10, wherein the turbo braking factor (TBF) of the exhaust gas turbocharger assumes in the four-stroke engine braking method a value lower than 0.005 (5‰):

$$TBF < 0.005.$$

* * * * *